(12) United States Patent
Molnar et al.

(10) Patent No.: US 7,382,368 B1
(45) Date of Patent: Jun. 3, 2008

(54) PLANAR Z REPRESENTATION FOR Z COMPRESSION

(75) Inventors: Steven E. Molnar, Chapel Hill, NC (US); Mark J. French, Raleigh, NC (US); John S. Montrym, Los Altos Hills, CA (US); Bengt-Olaf Schneider, Yorktown Heights, NY (US); Daniel P. Wilde, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 296 days.

(21) Appl. No.: 10/878,460

(22) Filed: Jun. 28, 2004

(51) Int. Cl.
G06T 15/40 (2006.01)
G06T 1/00 (2006.01)

(52) U.S. Cl. .................. 345/421; 345/422; 345/418

(58) Field of Classification Search ............. 345/421, 345/418, 422, 613, 614, 612, 581, 555, 530
See application file for complete search history.

(56) References Cited

U.S. PATENT DOCUMENTS

| | | | | |
|---|---|---|---|---|
| 5,929,862 A | * | 7/1999 | Barkans | 345/613 |
| 5,977,987 A | * | 11/1999 | Duluk, Jr. | 345/441 |
| 6,275,241 B1 | * | 8/2001 | Tanaka | 345/531 |
| 6,359,623 B1 | * | 3/2002 | Larson | 345/501 |
| 6,480,205 B1 | * | 11/2002 | Greene et al. | 345/631 |
| 6,518,974 B2 | * | 2/2003 | Taylor et al. | 345/582 |
| 6,556,203 B1 | * | 4/2003 | Nelson | 345/443 |
| 6,630,933 B1 | * | 10/2003 | Van Hook | 345/422 |
| 6,633,297 B2 | * | 10/2003 | McCormack et al. | 345/506 |
| 2003/0184555 A1 | * | 10/2003 | Fraser | 345/582 |

OTHER PUBLICATIONS

Morein, S., *Ati radeon hyper-z technology*, In presentation at Hot3D Proceedings, part of Graphics Hardware Workshop, 2000.

* cited by examiner

*Primary Examiner*—Kee M. Tung
*Assistant Examiner*—Joni Hsu
(74) *Attorney, Agent, or Firm*—Patterson & Sheridan, LLP

(57) ABSTRACT

A z buffer stores compressed z data represented in a planar format for one or more tiles. The compressed format includes a set of tile specific coefficients defining a plane equation for each z tested primitive intersecting the tile. The z buffer stores a maximum number of sets of tile specific coefficients for each tile, and when the maximum number of sets is exceeded for a particular tile, an uncompressed format is used to store the z data for the particular tile.

12 Claims, 12 Drawing Sheets

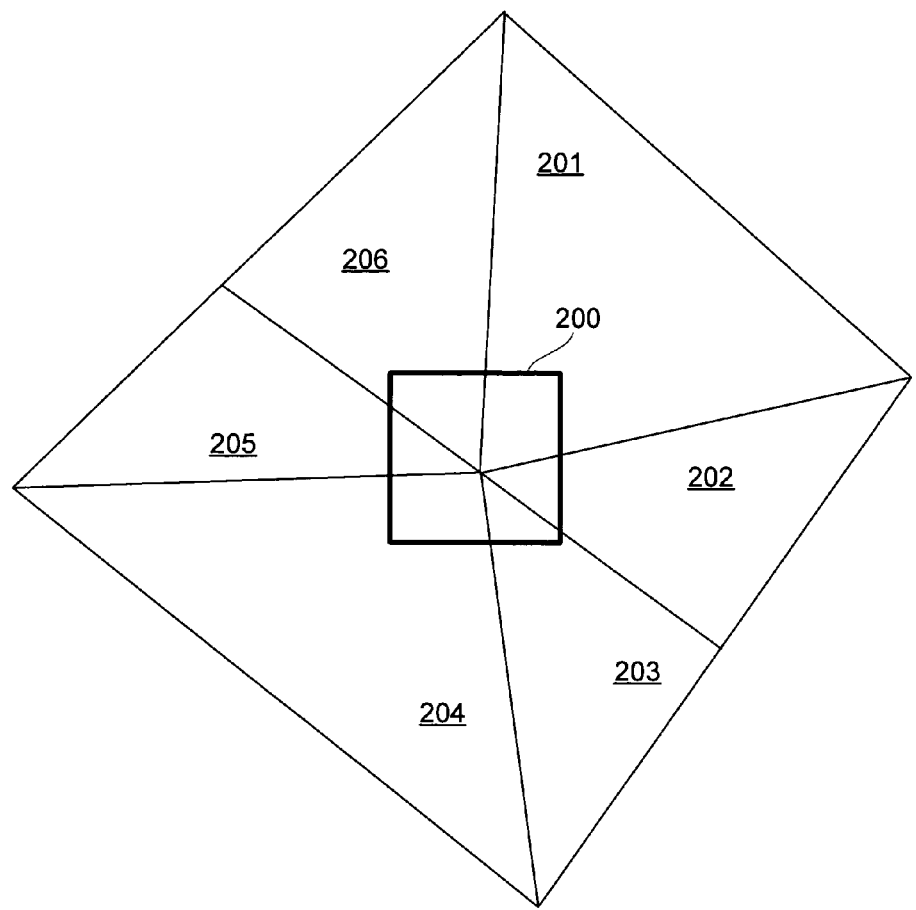
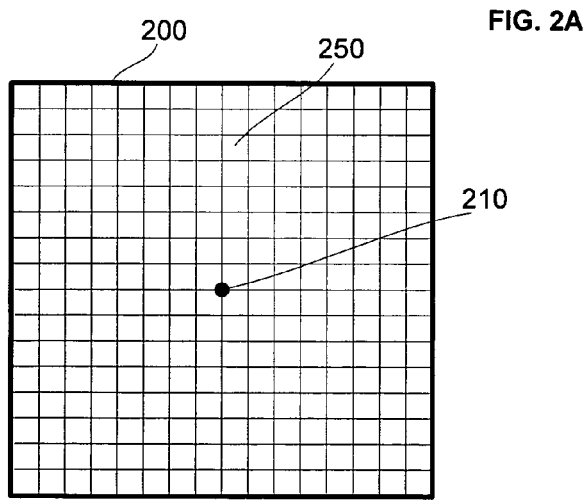
FIG. 2B
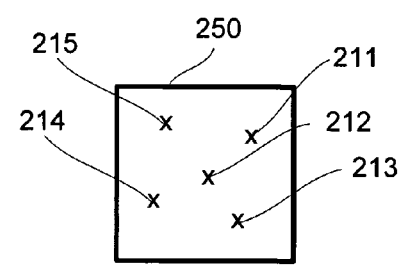
FIG. 2C
FIG. 2A

PLANAR Z REPRESENTATION FOR Z COMPRESSION

FIELD OF THE INVENTION

One or more aspects of the invention generally relate to computer graphics, and more particularly to using compressed z in a graphics processor.

BACKGROUND

Conventional graphics processors are exemplified by systems and methods developed to reduce bandwidth between a memory storing a z buffer and a graphics processor accessing the z buffer. Conventionally, some graphics processors compress z values prior to writing them into the z buffer and decompress the z values after reading them from the z buffer. The compression and decompression operations require additional computations, beyond the typical z data processing to perform hidden surface removal. The additional computations may require dedicated logic used only for that purpose or the additional computation may be performed using general purpose logic. In either case, the performance or efficiency of the graphics processor is negatively impacted.

There is thus a need for a z compression and z decompression which reduces the bandwidth used by a graphics processor accessing the z buffer and minimizes the number of additional computations needed to perform hidden surface removal.

SUMMARY

The current invention involves new systems and methods for compressing z data and decompressing z data using a planar z representation. Using compressed z data reduces the bandwidth needed to access a z buffer during image rendering. Using the planar z representation for compression minimizes the computations needed to compress the z data prior to storing it in the z buffer and permits trivial rejection or acceptance of new z data without requiring decompression of the z data read from the z buffer.

Various embodiments of a method of the invention include receiving plane equation coefficients defining a primitive intersecting a tile, determining a first tile specific coefficient of a tile specific plane equation for the primitive intersecting the tile based on a reference position within the tile, determining a second tile specific coefficient of the tile specific plane equation for the primitive intersecting the tile based on the plane equation coefficients, and determining a third tile specific coefficient of the tile specific plane equation for the primitive intersecting the tile based on the plane equation coefficients.

Various embodiments of a method of the invention include allocating a portion of memory within a z buffer for storing z data for a tile, determining a set of set of coefficients defining a tile specific plane equation for a primitive intersecting the tile, and storing the set of coefficients.

Various embodiments of a method of the invention include receiving tile specific coefficients for a plane equation defining a source primitive within a tile, determining a minimum source z value for the source primitive using the tile specific coefficients, determining a maximum source z value for the source primitive using the tile specific coefficients, and reading destination z data for the tile from a z buffer.

Various embodiments of a method of the invention include receiving plane equation coefficients defining a primitive intersecting a tile, determining tile specific coefficients of a tile specific plane equation for the primitive intersecting the tile based on a reference position within the tile, and reducing the precision of a tile specific coefficient of the tile specific coefficients by removing at least one bit of a mantissa value for the tile specific coefficient to produce reduced tile specific coefficients.

Various embodiments of the invention include a z operations unit. The z operations unit includes a source z evaluation unit configured to compute a source z value using tile specific coefficients, a destination z evaluation unit configured to receive destination z data from a z buffer and produce a destination z value, and a z test unit configured to determine whether or not the source z value or the destination z value should be stored in the z buffer.

Various embodiments of the invention include an apparatus for computing tile specific plane equation coefficients defining a primitive intersecting a tile. The apparatus includes a means for determining a set of tile specific coefficients corresponding to a tile specific plane equation for the primitive intersecting the tile based on a reference position within the tile and plane equation coefficients defining the primitive and a means for computing a source z value for the primitive using the set of tile specific coefficients.

Various embodiments of the invention include a computing system. The computing system includes a host processor, a host memory, a system interface, and a graphics processor. The host memory stores programs for the host processor. The system interface is configured to interface with the host processor and the graphics processor. The graphics processor includes a z operations unit.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

FIG. 2A illustrates primitives intersecting a tile in accordance with one or more aspects of the present invention.

FIG. 2B illustrates a reference position within the tile in accordance with one or more aspects of the present invention.

FIG. 2C illustrates sub-pixel sample positions within a pixel in accordance with one or more aspects of the present invention.

FIGS. 6A, 6B, 6C, and 6D illustrate an embodiment of a method of using compressed z data in accordance with one or more aspects of the present invention.

Figure 7:
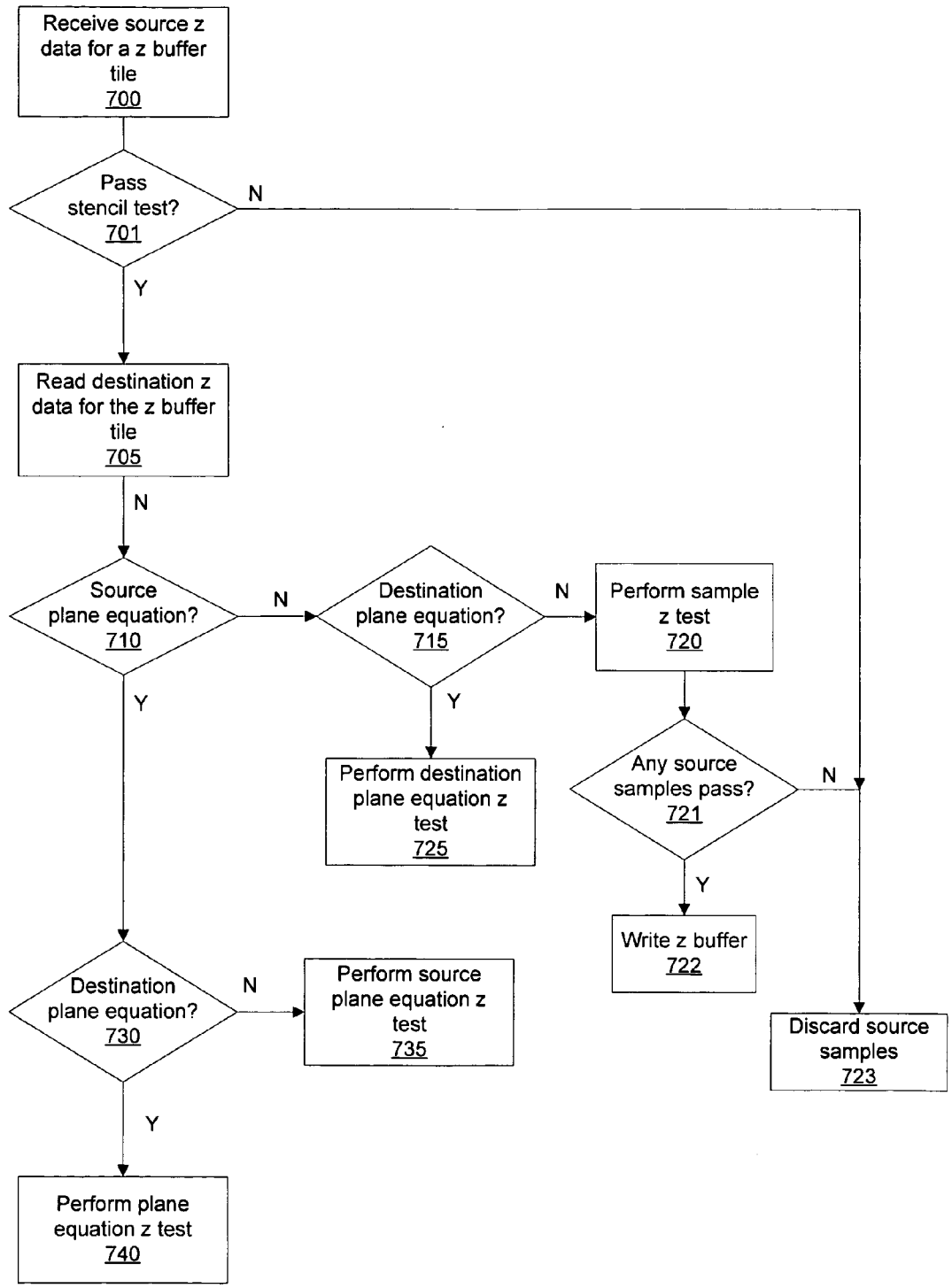

FIG. 7 illustrates an alternative embodiment of a method of using compressed z data in accordance with one or more aspects of the present invention.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
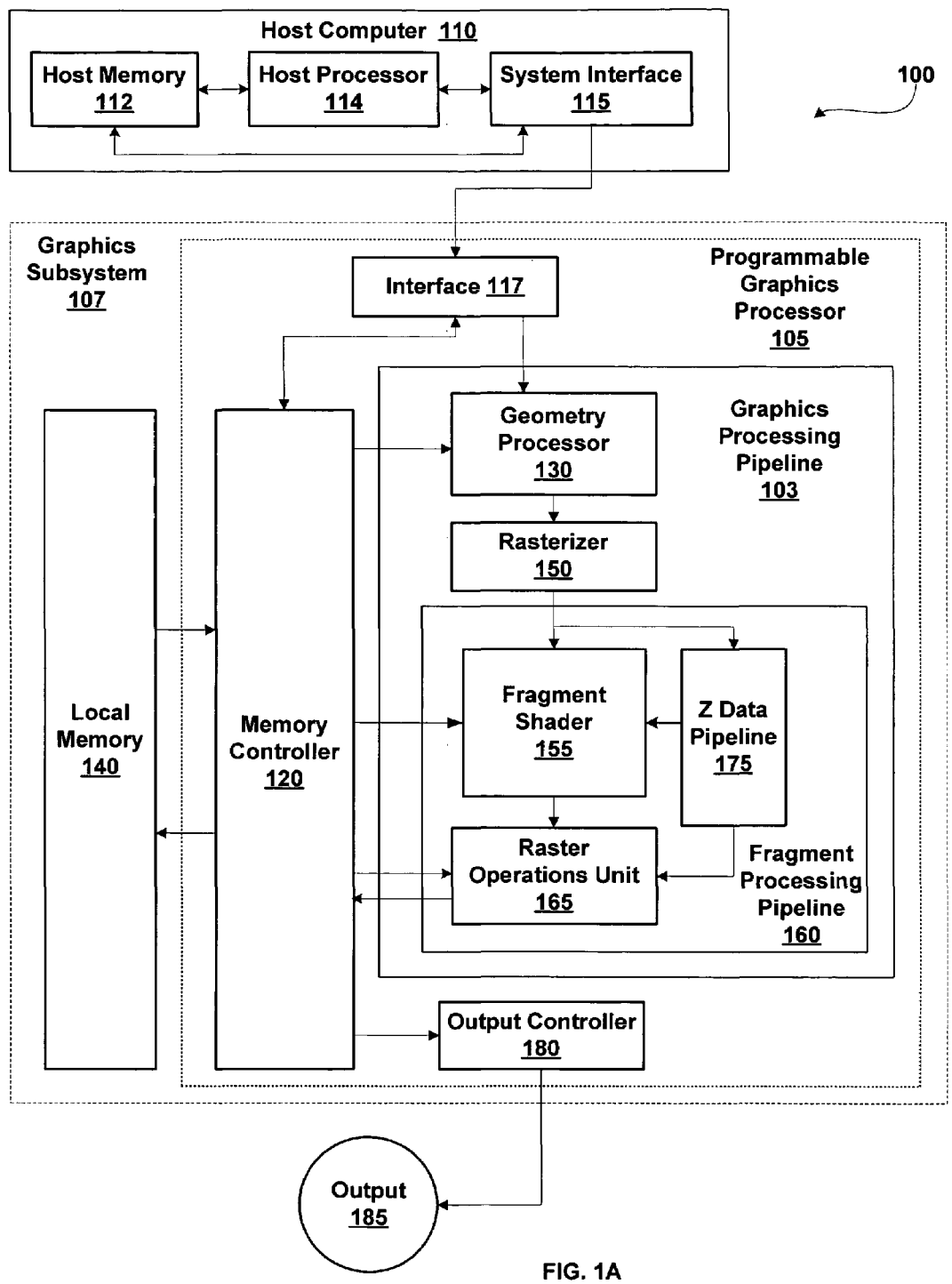
FIG. 1A is a block diagram of an exemplary embodiment of a respective computer system in accordance with one or more aspects of the present invention including a host computer and a graphics subsystem.

FIG. 1A is a block diagram of an exemplary embodiment of a Computing System generally designated 100 and including a Host Computer 110 and a Graphics Subsystem 107. Computing System 100 may be a desktop computer, server, laptop computer, palm-sized computer, tablet computer, game console, portable wireless terminal such as a personal digital assistant (PDA) or cellular telephone, computer based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. An example of System Interface 115 known in the art includes Intel® Northbridge.

Host computer 110 communicates with Graphics Subsystem 107 via System Interface 115 and an Interface 117. Graphics Subsystem 107 includes a Local Memory 140 and a Programmable Graphics Processor 105. Programmable Graphics Processor 105 uses memory to store graphics data and program instructions, where graphics data is any data that is input to or output from computation units within Programmable Graphics Processor 105. Graphics memory is any memory used to store graphics data or program instructions to be executed by Programmable Graphics Processor 105. Graphics memory can include portions of Host Memory 112, Local Memory 140 directly coupled to Programmable Graphics Processor 105, storage resources coupled to the computation units within Programmable Graphics Processor 105, and the like. Storage resources can include register files, caches, FIFOs (first in first out) memories, and the like.

In addition to Interface 117, Programmable Graphics Processor 105 includes a Graphics Processing Pipeline 103, a Memory Controller 120 and an Output Controller 180. Data and program instructions received at Interface 117 can be passed to a Geometry Processor 130 within Graphics Processing Pipeline 103 or written to Local Memory 140 through Memory Controller 120. In addition to communicating with Local Memory 140, and Interface 117, Memory Controller 120 also communicates with Graphics Processing Pipeline 103 and Output Controller 180 through read and write interfaces in Graphics Processing Pipeline 103 and a read interface in Output Controller 180.

Within Graphics Processing Pipeline 105, Geometry Processor 130 and a programmable graphics fragment processing pipeline, Fragment Processing Pipeline 160, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 130 and Fragment Processing Pipeline 160 are optionally configured such that data processing operations are performed in multiple passes through Graphics Processing Pipeline 103 or in multiple internal passes through Fragment Processing Pipeline 160. Each pass through Programmable Graphics Processor 105, Graphics Processing Pipeline 103 or Fragment Processing Pipeline 160 concludes with optional processing by a Raster Operations Unit 165.

Vertex programs are sequences of vertex program instructions compiled by Host Processor 114 for execution within Geometry Processor 130 and Rasterizer 150. Fragment programs are sequences of fragment program instructions compiled by Host Processor 114 for execution within Fragment Processing Pipeline 160. Geometry Processor 130 receives a stream of program instructions (vertex program instructions and fragment program instructions) and data from Interface 117 or Memory Controller 120, and performs vector floating-point operations or other processing operations using the data. The program instructions configure subunits within Geometry Processor 130, Rasterizer 150 and Fragment Processing Pipeline 160. The program instructions and data are stored in graphics memory, e.g., portions of Host Memory 112, Local Memory 140, or storage resources within Programmable Graphics Processor 105. When a portion of Host Memory 112 is used to store program instructions and data the portion of Host Memory 112 can be uncached so as to increase performance of access by Programmable Graphics Processor 105. Alternatively, configuration information is written to registers within Geometry Processor 130, Rasterizer 150 and Fragment Processing Pipeline 160 using program instructions, encoded with the data, or the like.

Data processed by Geometry Processor 130 and program instructions are passed from Geometry Processor 130 to a Rasterizer 150. Rasterizer 150 is a sampling unit that processes graphics primitives and generates sub-primitive data, such as pixel data or fragment data, including coverage data. Coverage data indicates which sub-pixel sample positions within a tile are "covered" by a fragment formed by the intersection of the tile and a primitive, where a tile is a region of pixels or sub-pixel sample positions in screen space. Graphics primitives include geometry, such as points, lines, triangles, quadrilaterals, meshes, surfaces, and the like. Rasterizer 150 converts graphics primitives into sub-primitive data, performing scan conversion on the data processed by Geometry Processor 130. Rasterizer 150 uses a set of fixed or programmed sub-pixel sample positions, the set is specified by a multisample mode. Rasterizer 150 outputs fragment data and fragment program instructions to Fragment Processing Pipeline 160. Rasterizer 150 outputs a portion of the fragment data, plane equation data, to a Z Data Pipeline 175. Z Data Pipeline 175 may include a storage resource such as a first-in first-out (FIFO) memory, register file, random access memory (RAM), or the like. As described further herein, the plane equation data includes tile specific z plane equation coefficients defining z values for the fragment within the tile.

The fragment programs configure the Fragment Processing Pipeline 160 to process fragment data by specifying computations and computation precision. Fragment Shader 155 is optionally configured by fragment program instructions such that fragment data processing operations are performed in multiple internal passes within Fragment Shader 155. Fragment Shader 155 computes and processes color values for one or more sub-pixel sample positions using the fragment data. Fragment Shader 155 may also compute z values for one or more sub-pixel sample positions using the plane equation data stored in Z Data Pipeline 175. Alternatively, Fragment Shader 155 may compute z values without using the plane equation data stored in Z Depth Data Pipeline 175.

Fragment Shader 155 outputs the processed fragment data and codewords generated from fragment program instructions to Raster Operations Unit 165. When necessary, Raster Operations Unit 165 determines sub-pixel z values for each sub-pixel sample position using sub-pixel sample positions specified by the multisample mode. Raster Operations Unit 165 receives the sub-pixel z values (included within the processed fragment data) from Fragment Shader 155 when the fragment program specifies a depth-replace shader. Alternatively, Raster Operations Unit 165 computes the sub-pixel z values as needed to perform hidden surface removal using the plane equation data received from Z Data Pipeline 175, as described further herein.

In one embodiment Raster Operations Unit 165 replicates the processed fragment data, such as color, received from Fragment Shader 155 for each sub-pixel sample position. In another embodiment Raster Operations Unit 165 receives sub-pixel data for each sub-pixel sample from Fragment Shader 155. In yet another embodiment, Raster Operations Unit 165 computes pixel or sub-pixel color values only when necessary dependent on the results of z testing, using plane equation data received from Z Data Pipeline 175 that includes tile specific color plane equation coefficients. Processing sub-pixel color values may reduce color space aliasing resulting from color variations between sub-pixel sample positions within a pixel, further improving image quality. Processing sub-pixel z values allows for proper handling of interpenetrating geometry to minimize bulkhead artifacts.

Raster Operations Unit 165 includes a read interface and a write interface to Memory Controller 120 through which Raster Operations Unit 165 accesses data, including compressed z data, stored in Local Memory 140 or Host Memory 112. Raster Operations Unit 165 optionally performs near and far plane clipping and raster operations, such as stencil, z test, blending, and the like, using the compressed or uncompressed fragment data stored in Local Memory 140 or Host Memory 112 at a pixel position (image location specified by x,y coordinates) associated with the processed fragment data. The output data from Raster Operations Unit 165 is written back to Local Memory 140 or Host Memory 112 at the pixel position associated with the output data and the results, e.g., image data, compressed z data, and the like, are saved in graphics memory.

When processing is completed, an Output 185 of Graphics Subsystem 107 is provided using Output Controller 180. Alternatively, Host Processor 114 reads the image stored in Local Memory 140 through Memory Controller 120, Interface 117 and System Interface 115. Output Controller 180 is optionally configured by opcodes to deliver data to a display device, network, electronic control system, other computing system, such as another Computing System 100, other graphics subsystem, such as another Graphics Subsystem 107, or the like. Furthermore, Output Controller 180 is optionally configured by opcodes to downfilter the image data, e.g., multi-sampled color data, combining the sub-pixel samples within each pixel to produce filtered pixels for display.

Figure 1B:
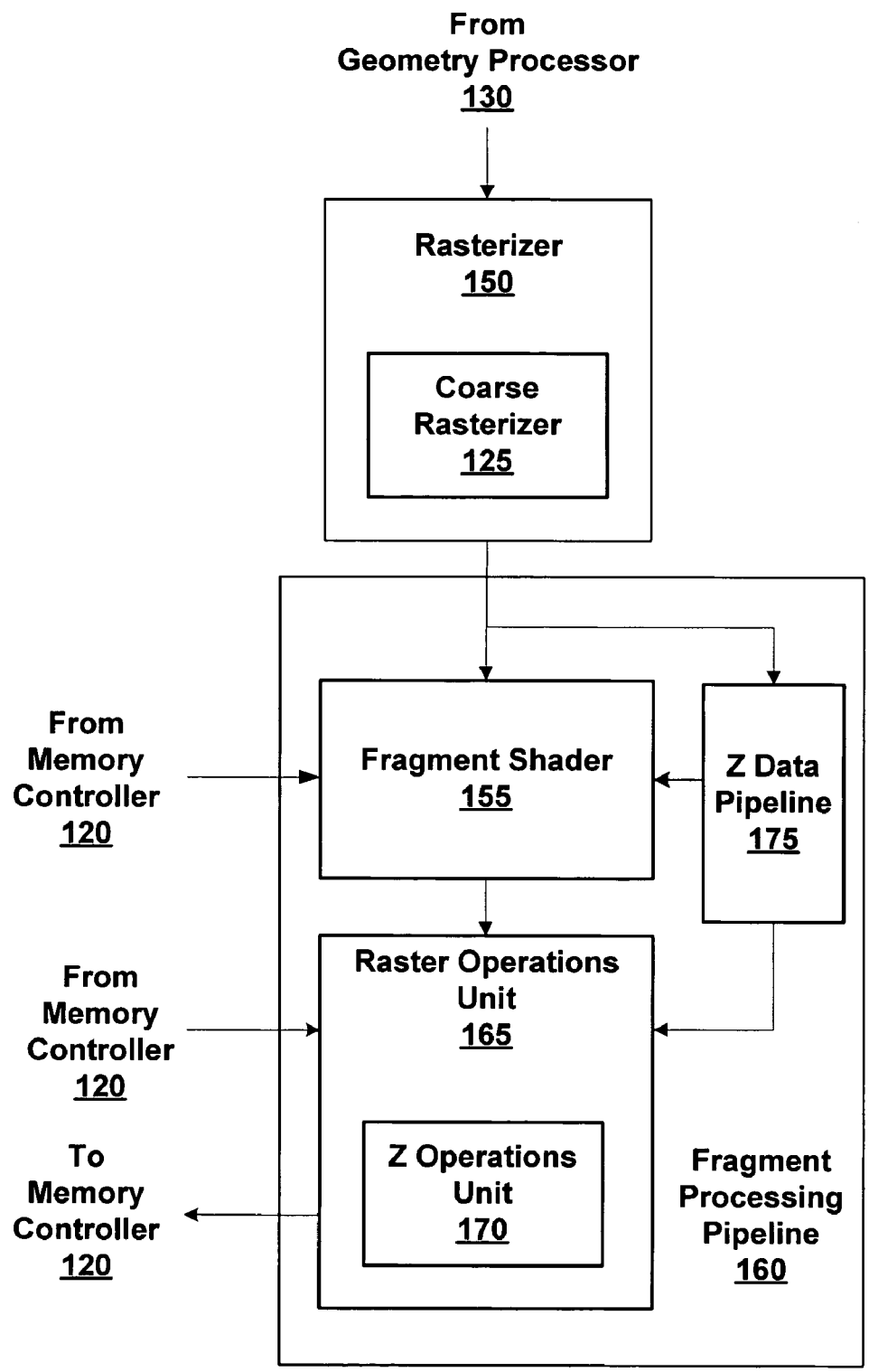
FIG. 1B is a block diagram of an exemplary embodiment of a portion of a graphics processing pipeline in accordance with one or more aspects of the present invention.

FIG. 1B is a block diagram of an exemplary embodiment of a portion of a graphics processing pipeline, such as Graphics Processing Pipeline 103, in accordance with one or more aspects of the present invention. Rasterizer 150 receives plane equation coefficients, typically produced by a triangle setup unit, for a primitive defining one or more parameters, e.g., texture coordinates, color components, and z. For example, z plane equation coefficients, A, B, and C may be used to compute a z value at any position (x,y) within the primitive by evaluating the plane equation:

$$Z \text{ value} = Ax + By + C.$$

Likewise, plane equation coefficients for other parameters, e.g. color components red, green, blue, alpha, and the like, may be used to compute values of the other parameters within the primitive.

Figure 3:
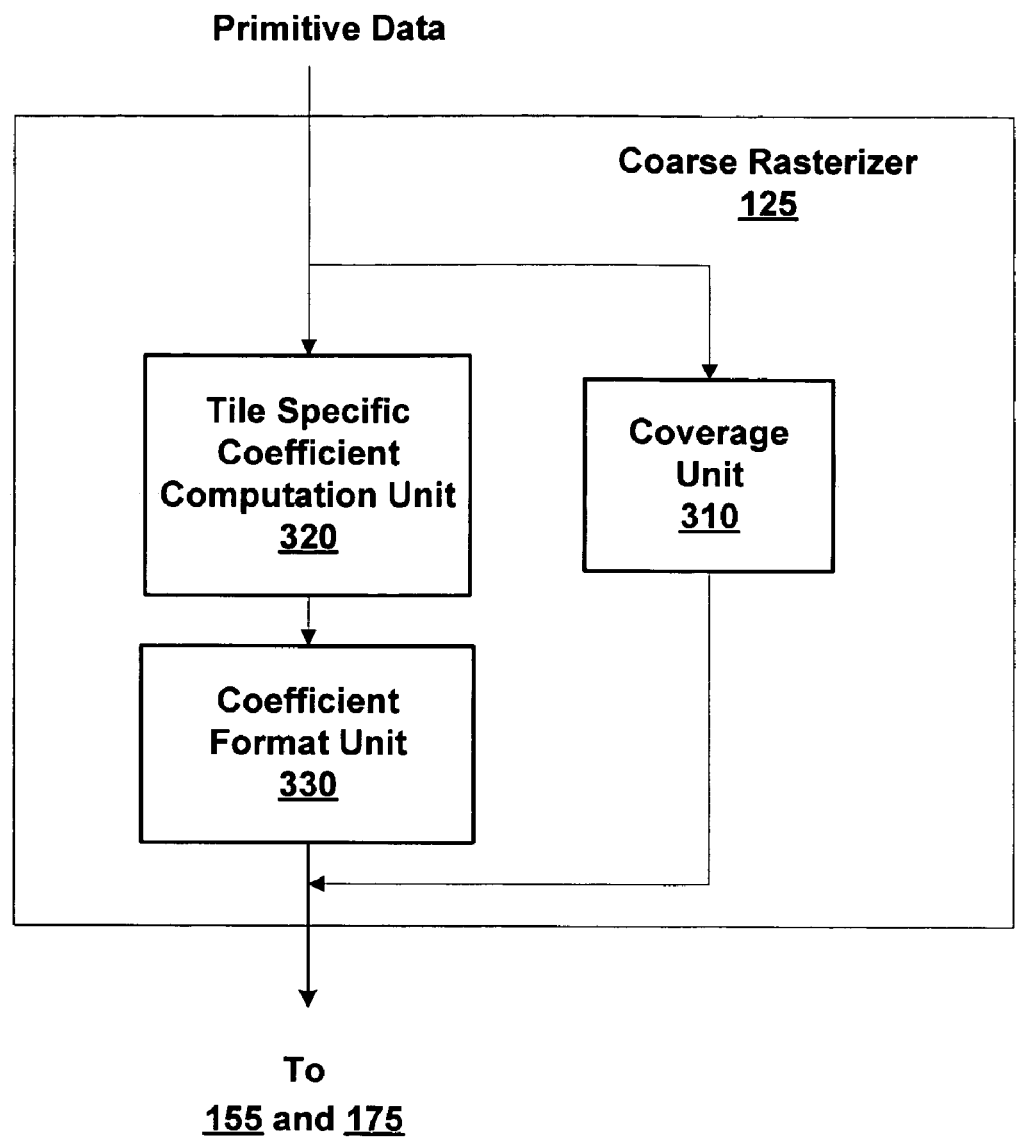
FIG. 3 is a block diagram of an exemplary embodiment of a coarse rasterizer in accordance with one or more aspects of the present invention.

A Coarse Rasterizer 125 within Rasterizer 150 receives the plane equation coefficients and computes tile specific plane equation coefficients, as described in conjunction with FIG. 3. A tile is a region of pixel or subpixel positions in screen space. The tile specific coefficients, as further described in conjunction with FIG. 4, may be used to compute a parameter value at a position within a fragment of the primitive, where the fragment is within the tile. Tile specific coefficients are computed for each tile intersected by the primitive and output to Fragment Processing Pipeline 160. In one embodiment of the present invention, tile specific coefficients are computed for z by Coarse Rasterizer 125 and output to Z Data Pipeline 175 and other parameters, such as color and texture coordinates, are computed for each pixel within the tile by Rasterizer 150 to produce fragment data and output to Fragment Shader 155. In an alternate embodiment of the present invention, tile specific coefficients are computed for other parameters, such as color and texture coordinates, and output to Fragment Shader 155.

As previously described in conjunction with FIG. 1A, Fragment Shader 155 receives fragment data from Rasterizer 150 and outputs processed fragment data, possibly including z values. Z Data Pipeline 175 receives plane equation data from Rasterizer 150 and outputs the plane equation data to Fragment Shader 155 or Raster Operations Unit 165. In one embodiment of the present invention, the plane equation data includes the plane equation coefficients. In other embodiments of the present invention, the plane equation data includes tile specific coefficients.

Figure 5A:
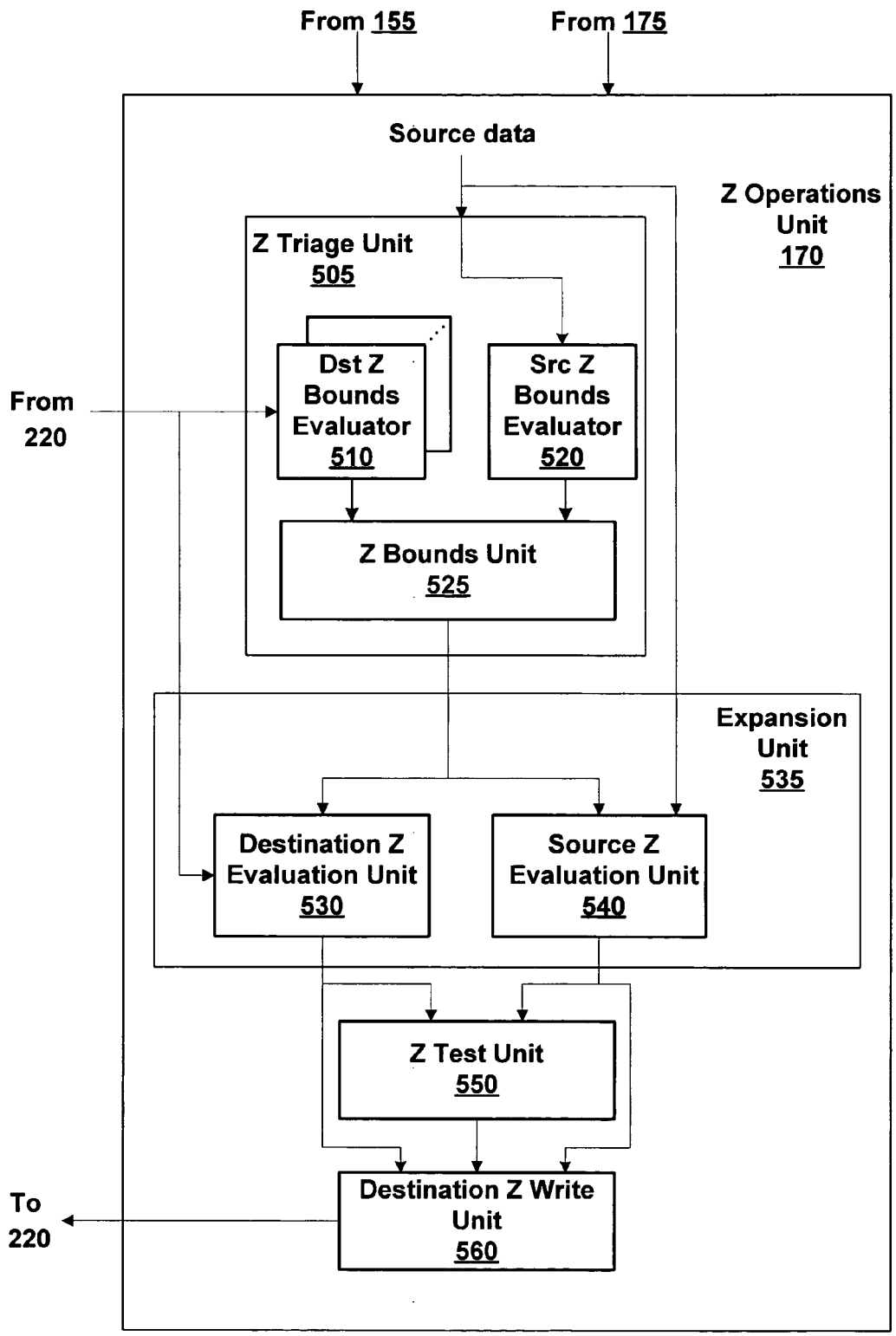
FIGS. 5A and 5B are block diagrams of exemplary embodiments of a z operations unit in accordance with one or more aspects of the present invention.
Figure 5B:
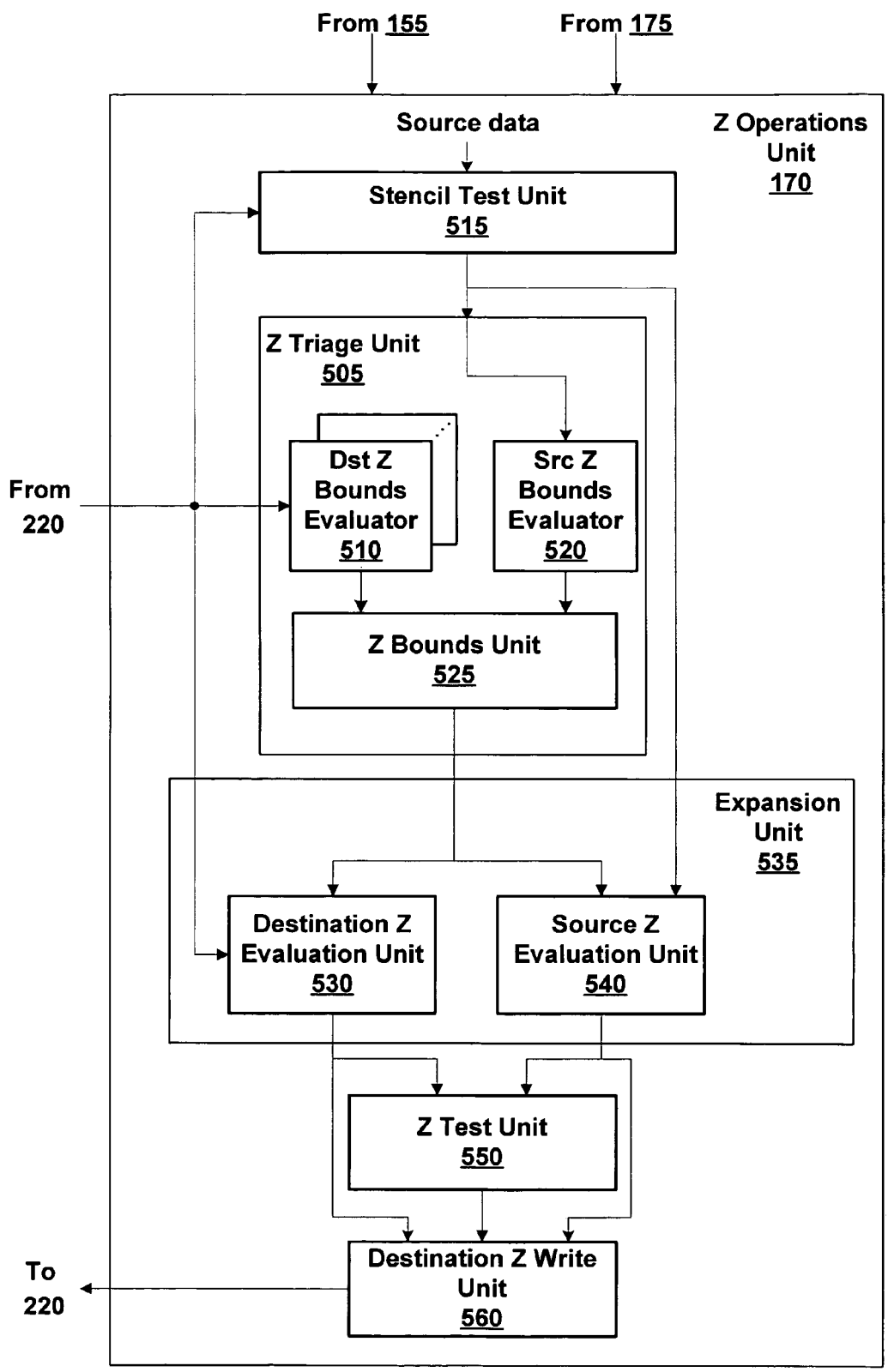

Raster Operations Unit 165 includes a Z Operations Unit 170, further described in conjunction with FIGS. 5A and 5B. Raster Operations Unit 165 reads graphics data stored in memory, such as compressed or uncompressed z data and stencil data stored in a z buffer. Z Operations Unit 170 performs z testing using compressed z data. However, in some ambiguous cases, e.g., intersecting primitives, Z Operations Unit 170 decompresses compressed z data as needed to perform z testing. Raster Operations, Unit 165 writes graphics data to memory as needed based on the results of the z testing to update the z buffer, and other buffers, such as a frame buffer.

A first condition exists within a tile when a single z plane, representing a primitive or a background (cleared) plane completely covers the tile. When this first condition exists for the tile, a single plane equation may be used to represent the z values within the tile. The coefficients for the single plane equation or tile specific coefficients corresponding to the single plane equation are a compressed planar z representation. A second condition exists within a tile when a single z plane representing a primitive along the edge of the object to cover a portion of the tile, overlapping either the background or another primitive completely covering the entire tile. The second condition also exists when an edge shared between two primitives lies within the tile such that fragments formed by the two primitives entirely cover the tile. When this second condition exists for the tile, the coefficients for the two plane equations and coverage information may be used to represent the z values within the tile. The coverage information indicates which samples refer to each plane equation. Alternatively, tile specific coefficients corresponding to the two plane equations and coverage information may be used to represent the z values within the tile. The coefficients for the two plane equations or tile specific coefficients are a compressed planar z representation. Additional conditions exist when additional primitives lie within the tile, such as at a shared vertex within a primitive mesh.

FIG. 2A illustrates primitives intersecting a tile that includes a vertex within a triangle mesh in accordance with one or more aspects of the present invention. Several primitives share the vertex within the triangle mesh, a Primitive 201, a Primitive 202, a Primitive 203, a Primitive 204, a Primitive 205, and a Primitive 206 intersect a Tile 200, forming six fragments within Tile 200. Each primitive is defined by a plane equation and the coefficients for each plane equation may be stored in a z buffer, along with coverage information, as a compressed planar z representation. Alternatively, the tile specific coefficients corresponding to each plane equation may be stored in the z buffer, along with coverage information, as another compressed planar z representation. Persons skilled in the art will recognize that plane equation coefficients defining plane equations for other parameters may be used as a compressed planar representation for each of those other parameters.

The compressed planar z representation including a set of coefficients defining a primitive may be used to compute a z value within the tile. The set of coefficients defining the primitive is represented with enough precision sufficient to generate z values across the entire screen. Typically A and B are represented in an IEEE 32-bit floating point format and C is represented with additional mantissa bits so that C is represented using more than 32 bits. The precision of a set of coefficients needed to generate z values within a tile is less than the precision needed to generate z values across the entire screen. Therefore, tile specific plane coefficients of a tile specific plane equation, where each coefficient represented with reduced precision, may be used to compute primitive parameters, such a z values, for a fragment within a tile. A specific set of tile specific coefficients is used to compute a primitive parameter for each fragment of a primitive within a different tile. The tile specific coefficients within each specific set of tile specific coefficients may vary even though they were each generated from the same plane equation coefficients.

Table 1 illustrates an example encoding for uncompressed z values and compressed planar representations for one to six fragments, i.e., plane equation coefficients or tile specific coefficients, within a tile. The compression tag is stored with the plane equation data to indicate the number of z planes that are encoded in the plane equation data. The compression ratio is determined by comparing the number of bits needed to represent the uncompressed z values to the number of bits needed to represent the compressed planar z representation. In an alternate embodiment of the present invention, 0, 1, or 2 z planes are used and the compression tag is a single bit.

TABLE 1

| Compression tag | Compression ratio | Encoding |
|---|---|---|
| 0x0 | Uncompressed | 8x8 samples |
| 0x1 | 8:1 compressed | 1 or 2 z planes |
| 0x2 | 8:2 compressed | 3 or 4 z planes |
| 0x3 | 8:3 compressed | 5 or 6 z planes |

FIG. 2B illustrates a Reference Position 210, located at $(x_c, y_c)$ within Tile 200 in accordance with one or more aspects of the present invention. Tile specific coefficients, $A_t$, $B_t$, and $C_t$, of a tile specific plane equation may be determined using the plane equation coefficients, A, B, and C, and Reference Position 210. In FIG. 2B, Reference Position 210 is located at the center of Tile 200. In alternate embodiments of the present invention, Reference Position 210 is located at other positions within Tile 200.

Z plane equation coefficients, A, B, and C, and Reference Position 210 may be used to compute a z value at position (x,y) within Tile 200 by evaluating the tile specific plane equation:

$$Z\ \text{value} = A_t*(x-x_c) + B_t*(y-y_c) + C_t.$$

Likewise, tile specific plane equation coefficients for other parameters, e.g. color components red, green, blue, alpha, and the like, may be used to compute values of the other parameters within Tile 200. Tile specific coefficients $A_t$ and $B_t$ are determined using plane equation coefficients A and B, respectively, by removing some mantissa lsbs (least significant bits). For example, when Tile 200 is divided into a 16×16 grid, 23 bits of mantissa are used for $A_t$ and $B_t$. Tile specific coefficient $C_t$ is computed using the plane equation coefficients, A, B, and C, and Reference Position 210:

$$C_t = Z(x_c, y_c) = A*x_c + B*y_c + C.$$

When Tile 200 is divided into a 16×16 grid, a 26-bit mantissa is sufficient precision for $C_t$, compared with a 28-bit mantissa for C.

Subtraction of $x_c$ from x may be computed by removing the msbs (most significant bits) from x and $x_c$. For example, when Tile 200 is divided into a 16×16 grid, the lsbs of x and $x_c$ are needed to compute $(x-x_c)$. Likewise, subtraction of $y_c$ from y may be computed after removing msbs (most significant bits) from y and $y_c$. Although the x and y dimensions of Tile 200 are equal, in alternate embodiments of the present invention a tile may be rectangular, with differing x and y dimensions.

Tile 200 is fixed in pixel space, i.e. including a specific number of pixels, such as a Pixel 250. In one embodiment, Tile 200 includes 256 Pixels 250 (16×16). In other embodiments, Tile 200 includes a different number of Pixels 250.

FIG. 2C illustrates sub-pixel sample positions within Pixel 250 in accordance with one or more aspects of the present invention. A multisample mode determines how many sub-pixel sample positions are used for each pixel. For example, in one embodiment of the present invention, 1 sub-pixel sample position, a Position 212, is specified by the multisample mode. In another embodiment of the present invention, 2 sub-pixel sample positions, a Position 211 and a Position 214, or a Position 215 and a Position 213, are specified by the multisample mode. In yet another embodiment of the present invention, 4 sub-pixel sample positions, Position 211, Position 213, Position 214, and Position 215, are specified by the multisample mode. Therefore, the amount of memory in a z buffer needed to store uncompressed z value(s) for each pixel when a 4 sub-pixel multisample mode is specified is 4 times the amount of memory needed to store uncompressed z values when a 1 sub-pixel multisample mode is specified.

In one embodiment of the present invention, the z buffer is divided into z memory tiles which are a fixed size, not in pixels as is Tile 200, but in bytes. For example, each z memory tile stores 32×8 bytes configured as 8 32 byte memory atoms. When a 1 sub-pixel multisample mode is specified, each z memory tile may store uncompressed z values for 32 pixels (32 sub-pixel z values) and 8 z memory tiles are allocated for each Tile 200. When a 2 sub-pixel multisample mode is specified, each z memory tile may store uncompressed z values for 16 pixels (32 sub-pixel z values) and 16 z memory tiles are allocated for each Tile 200. When a 4 sub-pixel multisample mode is specified, each z buffer tile may store uncompressed z values for 8 pixels (32 sub-pixel z values) and 32 z memory tiles are allocated for each Tile 200.

Table 2 includes the data from Table 1 with an additional column the number of z memory tiles needed to store compressed and uncompressed z data within a Tile 200 including 16×16 pixels. In order to accommodate storing uncompressed z data, 8 z memory tiles are allocated for each Tile 200. When fewer z memory tiles are needed to store compressed z data, fewer read and write transactions are needed to update the z buffer, therefore less bandwidth is needed compared with storing uncompressed z memory tiles. In other embodiments of the present invention, only one bit of the compression tag is used. Therefore, only up to 2 z planes are encoded (as shown in the first two rows of Table 1 and Table 2) using the planar z representation, where a z plane is a fragment defined by a tile specific plane equation. In the other embodiments of the present invention, a memory atom is 16 bytes and a z memory tile is 32 bytes×4, configured as 8 16 bytes memory atoms. The more z planes that are represented in the compressed z format, the more bytes there are per memory atom and z memory tile.

TABLE 2

| Compression tag | z memory tiles | Compression ratio | Encoding |
|---|---|---|---|
| 0x0 | 8 | Uncompressed | 8x8 samples |
| 0x1 | 1 | 8:1 compressed | 1 or 2 z planes |
| 0x2 | 2 | 8:2 compressed | 3 or 4 z planes |
| 0x3 | 3 | 8:3 compressed | 5 or 6 z planes |

In an alternate embodiment of the present invention, Tile 200 includes a fixed number of sub-pixel samples, and the footprint of Tile 200 in screen space varies dependent on the multisample mode specified. In another alternate embodiment of the present invention, the footprint of Tile 200 is fixed in pixel space, the number of z memory tiles allocated for each Tile 200 is fixed, and independent of the multisample mode specified, but the number of bytes per z memory tile varies dependent on the multisample mode specified. Persons skilled in the art will recognize that, just as z memory tiles are used to store z values, frame memory tiles may be used to store other parameters, such as color components.

FIG. 3 is a block diagram of an exemplary embodiment of Coarse Rasterizer 125 in accordance with one or more aspects of the present invention. Coarse Rasterizer 125 receives plane equation coefficients, A, B, and C, and a Tile Specific Coefficient Computation Unit 320 determines tile specific plane equation coefficients $A_t$, $B_t$, and $C_t$. A Coverage Unit 310 computes coverage information, using techniques known to persons skilled in the art, for the portion of the primitive within the tile using the tile specific plane equation. The coverage information is based on the multisample mode. In one embodiment of the present invention, 32 bits of coverage information are used to indicate sub-pixel coverage for each sub-pixel sample within a z buffer tile.

A Coefficient Format Unit 330 receives $A_t$, $B_t$, and $C_t$ from Tile Specific Coefficient Computation Unit 320 and formats the tile specific coefficients into a reduced format. Specifically, in one embodiment of the present invention, Coefficient Format Unit 330 determines which tile specific coefficient has the largest exponent and sets a tag value (2 bits) to indicate the coefficient. Coefficient Format Unit 330 then computes the difference between the largest exponent and the exponent of each of the remaining coefficients to produce 2 mantissa shift values. The tile specific coefficients, represented in a reduced format including the mantissas of $A_t$, $B_t$, and $C_t$, the largest exponent, the two mantissa shift values, the tag value, and the coverage information, are output to Fragment Shader 155 and/or Z Data Pipeline 175. The two mantissa shift values may each be 2 bits smaller than the corresponding exponents.

In another embodiment of the present invention, Coefficient Format Unit 330 computes the difference between the exponent of $C_t$ and the exponent of each of the other coefficients, $A_t$ and $B_t$, to produce 2 mantissa shift values. The tile specific coefficients, represented in a reduced format including the mantissas of $A_t$, $B_t$, and $C_t$, the exponent of $C_t$, the two mantissa shift values, and the coverage information, are output to Fragment Shader 155 and/or Z Data Pipeline 175. The two mantissa shift values may each be 2 bits smaller than the corresponding exponents. In a further alternate embodiment of the present invention, Coefficient Format Unit 330 is omitted and the tile specific coefficients are output directly from Tile Specific Coefficient Computation Unit 320 to Fragment Shader 155 and/or Z Data Pipeline 175.

Figure 4A:
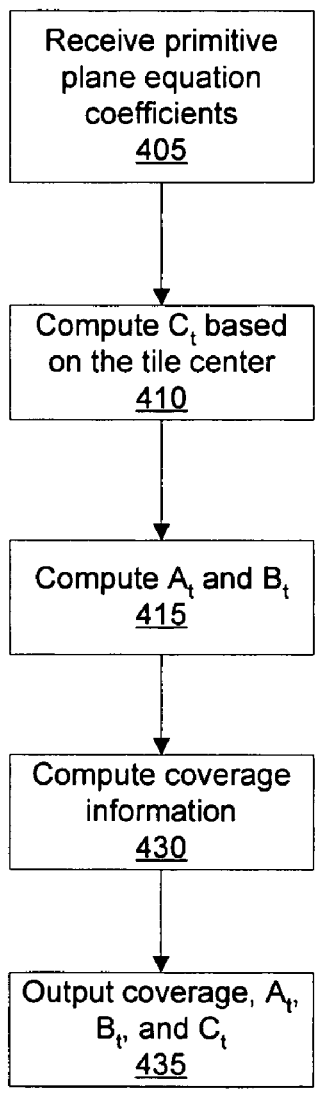
FIGS. 4A and 4B illustrates embodiments of methods for determining tile specific plane equation coefficients in accordance with one or more aspects of the present invention.

FIG. 4A illustrates an embodiment of a method for determining the tile specific plane equation coefficients in accordance with one or more aspects of the present invention. In step 405 Coarse Rasterizer 125 receives primitive data including the plane equation coefficients, A, B, and C defining the primitive. In step 410 Tile Specific Coefficient Computation Unit 320 computes $C_t$ using plane equation coefficients A, B, and C and the reference position within the tile. In step 415 Tile Specific Coefficient Computation Unit 320 computes $A_t$ and $B_t$ using plane equation coefficients A and B. In step 430 Coverage Unit 310 computes the coverage information. In step 435 Coarse Rasterizer 125 outputs the coverage information and the tile specific plane equation coefficients, $A_t$, $B_t$, and $C_t$ to Fragment Shader 155 and/or Z Data Pipeline 175.

Figure 4B:
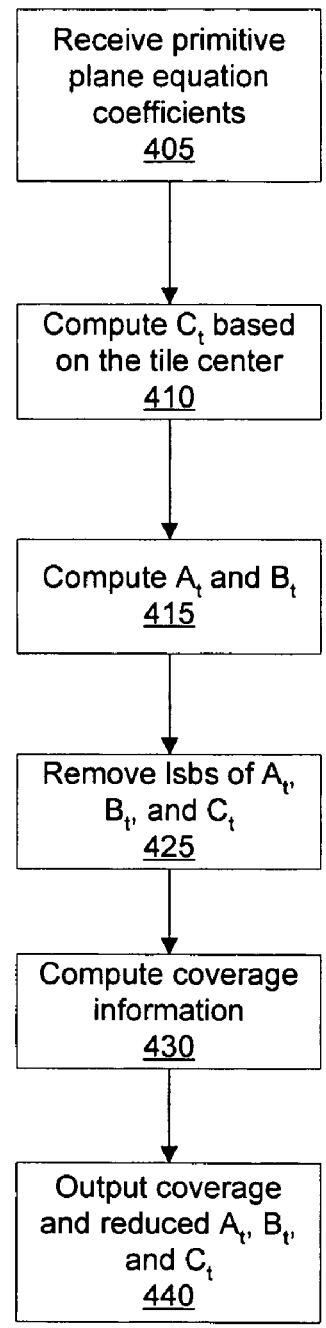

FIG. 4B illustrates an embodiment of a method, including some of the steps described in conjunction with FIG. 4A, for determining the tile specific plane equation coefficients in accordance with one or more aspects of the present invention. Steps 405, 410, and 415 proceed as previously described. In step 425 Coefficient Format Unit 330 reformats $A_t$, $B_t$, and $C_t$ to reduce the number of bits used to represent one or more of the tile specific plane equation coefficients, by removing lsbs, thereby producing reduced plane equation coefficients. In step 430 Coverage Unit 310 computes the coverage information. In step 440 Coarse Rasterizer 125 outputs the coverage information and the reduced tile specific plane equation coefficients, $A_t$, $B_t$, and $C_t$ to Fragment Shader 155.

Persons skilled in the art will appreciate that any system configured to perform the method steps of FIG. 4A or 4B, or their equivalents, is within the scope of the present invention.

FIG. 5A is a block diagram of an exemplary embodiment of Z Operations Unit 170 in accordance with one or more aspects of the present invention. When Raster Operations Unit 165, including Z Operations Unit 170, receives fragment data for a z buffer tile from Fragment Shader 155 and/or Z Data Pipeline 175, Raster Operations Unit 165 reads the z buffer stored in graphics memory to obtain z data corresponding to the pixel position of the fragment data. In an alternative embodiment, Raster Operations Unit 165 receives fragment data for a tile, such as Tile 200, a portion of a z buffer tile, or another portion of a tile. In some embodiments of the present invention, a cache is used and Memory Controller 120 initiates a read request when there is a cache miss. A Z Triage Unit 505 within Z Operations Unit 170 receives source (src) z data, specifically, tile specific coefficients and coverage from Z Data Pipeline 175 or z values and coverage from Fragment Shader 155. Z Triage Unit 505 also receives destination (dst) z data from the z buffer. The dst z data may be compressed or uncompressed. Z Triage Unit 505 performs a trivial z test based on the minimum and maximum z values for the source z data and the destination z data without decompressing z data that is compressed, i.e., represented using tile specific coefficients. The result of the trivial z test may be used to reject the source data, accept the source data, or determine that z values for each sub-pixel sample position need to be compared in a Z Test Unit 550.

The source z data is input to a Src Z Bounds Evaluator 520 which determines a minimum source z value and a maximum source z value. When z values are received from Fragment Shader 155, Src Z Bounds Evaluator 520 may determine the minimum source z value and the maximum source z value using a comparison operation. In an alternate embodiment of the present invention, the result of the trivial z test indicates that z values for each sub-pixel sample position need to be compared in the Z Test Unit 550, when z values are received from Fragment Shader 155.

When tile specific coefficients are received from Z Data Pipeline 175, Src Z Bounds Evaluator 520 may determine the minimum source z value and the maximum source z value using these equations:

$$\text{minimum source } z \text{ value} = C_t - |A_t|*\text{tilewidth}/2 - |B_t|*\text{tileheight}/2 \text{ and}$$

$$\text{maximum source } z \text{ value} = C_t + |A_t|*\text{tilewidth}/2 + |B_t|*\text{tileheight}/2,$$

where, the tilewidth is the width of the tile, e.g., 16 for Tile 200, and the tileheight is the height of the tile, e.g., 16 for Tile 200. In other embodiments of the present invention, the tilewidth and the tileheight are not equal. Furthermore, in some embodiments of the present invention, the minimum source z value and maximum source z value are determined for a z memory tile, so tilewidth and tileheight are based on the width and height of the z memory tile in pixel space, respectively.

The destination z data is input to Dst Z Bounds Evaluator 510 which determines a minimum destination z value and a maximum destination z value. The result of the trivial z test indicates that z values for each sub-pixel sample position need to be compared in the Z Test Unit 550, when uncompressed z values are received from Memory Controller 120.

When compressed z data, i.e., tile specific coefficients, are received from Memory Controller 120, each Dst Z Bounds Evaluator 510 may determine the minimum destination z value and the maximum destination z value for a set of tile specific coefficients using these equations:

$$\text{minimum source } z \text{ value} = C_t - |A_t|*\text{tilewidth}/2 - |B_t|*\text{tileheight}/2 \text{ and}$$

$$\text{maximum source } z \text{ value} = C_t + |A_t|*\text{tilewidth}/2 + |B_t|*\text{tileheight}/2,$$

In some embodiments of the present invention, Z Triage Unit 505 selects the minimum destination z value and the maximum destination z value from minimum and maximum destination z values that are determined when more than one set of tile specific coefficients are stored for the tile. In other embodiments of the present invention, Z Triage Unit 505 outputs the minimum destination z value and the maximum destination z value for each set of tile specific coefficients. In some embodiments of the present invention, the minimum destination z value and maximum destination z value are determined for a z memory tile, so tilewidth and tileheight are based on the width and height of the z memory tile in pixel space, respectively. Therefore, only a single z memory tile is read, rather than 8 z memory tiles for Tile 200.

Src Z Bounds Evaluator 520 outputs the minimum and maximum source z values to a Z Bounds Unit 525 and Dst Z Bounds Evaluator 510 outputs the minimum and maximum destination z values to the Z Bounds Unit 525. Z Bounds Unit 525 determines the trivial z test result based on a z test mode, e.g., always, never, less than, greater than, and the like, specified by the application programming interface (API), the minimum and maximum source z values and source coverage information, and the minimum and maximum destination z values and destination coverage information. The trivial z test result indicates whether the source data should be rejected, the source data should be accepted, or that z values for each sub-pixel sample position need to be compared.

For example, when a "less than" z test is specified and the maximum source z value is less than than the minimum destination z value, the trivial z test result indicates that the source data should be accepted. In contrast, when a "greater than" z test is specified and the minimum source z value is greater than the maximum destination z value, the trivial z test result indicates that the source data should be rejected. Furthermore, when the destination coverage information indicates that a particular set of destination tile specific coefficients do not overlap with the source z data, the minimum and maximum destination z values computing using the particular set of destination tile specific coefficients are not compared with the minimum and maximum source z values.

When the "always" z test is specified the trivial z test result indicates that the source data should be accepted. When the "never" z test is specified, the trivial z test result indicates that the source data should be rejected. When a z test mode other that "always" or "never" is specified and the source z interval bounded by the minimum source z value and the maximum source z value has at least one z value that overlaps with the destination z interval, bounded by the minimum destination z value and the maximum destination z value, the trivial z test result indicates that z values for each sub-pixel sample position need to be compared. In some embodiments of the present invention, z clip interval testing and/or z bounds interval testing is also performed in Z Bounds Unit 525. For example, when the source z interval bounded by the minimum source z value and the maximum source z value has at least one z value that overlaps with the z clip interval, bounded by the z clip minimum and z clip maximum the trivial z test result indicates that z values for each sub-pixel sample position need to be compared. Similarly, when any destination z interval bounded by a minimum destination z value and a maximum destination z value has at least one z value that overlaps with the z bounds interval, bounded by the z bounds minimum and z bounds maximum, when z bounds testing is enabled, the trivial z test result indicates that z values for each sub-pixel sample position need to be compared.

Z Bounds Unit 525 may also determine when the source tile specific coefficients are equal to a set of destination tile specific coefficients and the coverage information for the source tile specific coefficients and the coverage information for the set of destination tile specific coefficients may be combined, so that the set of destination tile specific coefficients and the combined coverage information is stored for the z buffer tile. Combining equal tile specific coefficients, results in improved compression because two fragments within the z-buffer tile are effectively merged into one fragment.

Further improved compression may be achieved by using a lossy z plane optimization which reduces the precision of the tile specific coefficients, so that several higher precision tile specific coefficients are represented by one lower precision tile specific coefficient. The lower precision tile specific coefficients are then determined to be equal to destination tile specific coefficients by Z Bounds Unit 525, and are merged. The precision reduction employed by the lossy z plane optimization may be specifying one or more masks that are applied to the plane equation coefficient mantissas that are received by Rasterizer 150. For example, a first mask may be used to mask 0 to 15 lsb bits of the A mantissa and the B mantissa. A second mask may be used to mask 0 to 15 lsb bits of the C mantissa. Specifically, a setup unit generating the plane equation coefficients may set the highest masked lsb to 1 and the remaining masked lsbs to 0, thereby equalizing the error resulting from lowering the precision. The results of the lossy z plane optimization are deterministic, although using it may result in a subtly different image than when full-precision tile specific coefficients are used.

Z Bounds Unit 525 outputs the trivial z test result to an Expansion Unit 535. The trivial z test result is determined without decompressing either the source z data or the destination z data. Furthermore, the trivial z test result is computed for an entire tile, so fragment data for several pixels may be trivially accepted or rejected without decompressing either the source or destination z data.

Expansion Unit 535 receives the trivial z test result, the destination z data, and the source z data and performs a per sub-pixel expansion of z data represented in the compressed format to produce expanded destination z data and expanded source z data. When the trivial z test result indicated the source z data should be accepted or Z Bounds Unit 525 indicates that the source tile specific coefficients are equal to a set of destination tile specific coefficients, Expansion Unit 535 outputs the source z data as the expanded source z data to Z Test Unit 550. When the trivial z test result indicates the source z data should be rejected, no output is generated to Z Test Unit 550. Finally, when z testing is disabled, Expansion Unit 535 does not expand the destination z data and the source z data.

When the trivial z test result indicates the z values for the source and destination z data need to be computed and the source z data is represented using tile specific coefficients, a Source Z Evaluation Unit 540 evaluates a tile specific plane equation to compute the tile z values using the source z data and the multisample mode. When the source z data is represented as z values, the source z data is output by Expansion Unit 535, as the expanded source z data, to Z Test Unit 550. When the trivial z test result indicates the z values for the source and destination z data need to be computed and the source z data is represented using tile specific coefficients, a Source Z Evaluation Unit 540 evaluates a tile specific plane equation to compute the tile z values using the source z data and the multisample mode. When the source z data is represented as z values, the source z data is output, as the expanded source z data, by Expansion Unit 535 to Z Test Unit 550.

When the trivial z test result indicates the z values for the source and destination z data need to be computed and the destination z data is represented using tile specific coefficients, a Destination Z Evaluation Unit 530 evaluates one or more tile specific plane equations and the coverage information when two or more fragments lie within the tile, to compute the tile z values using the destination z data and the multisample mode. The tile z values are output by Destination Z Evaluation Unit 530 as the expanded destination z data. When the destination z data is represented as z values, the destination z data is output, as the expanded destination z data, by Expansion Unit 535 to Z Test Unit 550.

When the trivial z test result indicates that the source data should be accepted, Z Test Unit 550 outputs only the compressed source data when the z buffer tile is fully covered by the source data (indicated by the source data coverage information). When the expanded source data does not fully cover the z buffer tile, Z Test Unit 550 outputs the expanded source data, source data coverage information, expanded destination data for any sub-pixel positions not covered by the source data, and expanded destination data coverage information. When Z Bounds Unit 525 indicates that the source tile specific coefficients are equal to a set of destination tile specific coefficients, Z Test Unit 550 combines the coverage information corresponding to the source tile specific coefficients and the set of destination tile specific coefficients to produce surviving coverage information.

When the trivial z test result indicates the z values for the source and destination z data need to be computed, Z Test Unit 550 compares the source z value to the destination z value for each sub-pixel sample position specified by the multisample mode and produces a sub-pixel sample z test result indicating whether or not the source z value passed. Z Test Unit 550 uses the z test results to determine the surviving coverage information corresponding to the surviving expanded source data and the surviving expanded destination data for the z buffer tile. Z Test Unit 550 outputs the surviving coverage information to a Destination Z Write Unit 560.

Destination Z Write Unit 560 formats the surviving expanded source data, the surviving expanded destination data, and the surviving coverage information into a compressed or uncompressed format and initiates a write request to Memory Controller 120 to write the z buffer tile in the z buffer. When the surviving coverage information indicates that the source data is not covered, Destination Z Write Unit 560 does not initiate a z buffer write request. When either the surviving expanded source data or any of the surviving expanded destination data was received by Z Triage Unit 505 in the uncompressed format (as z values), the surviving expanded source and the surviving expanded destination data are represented in the uncompressed format.

In one embodiment of the present invention, up to 2 sets of tile specific coefficients may be stored in the z buffer as the compressed planar z representation for a z buffer tile, as described in conjunction with Tables 1 and 2. In the embodiment of the present invention, up to 6 sets of tile specific coefficients may be stored in the z buffer as the compressed planar z representation for a z buffer tile. When the number of sets of tile specific coefficients needed to represent the fragments within the z buffer tile exceeds the number that may be stored in the z buffer tile, the z values (one per sub-pixel sample position) are stored, i.e., the z data is uncompressed for the z buffer tile. A format tag, such as the compression tag in Tables 1 and 2, is also stored for the z buffer tile indicating whether the z data for the z buffer tile stored in the z buffer is compressed or uncompressed. The format tag may also indicate how many sets of tile specific coefficients are stored for each z buffer tile.

FIG. 5B is a block diagram of another exemplary embodiment of Z Operations Unit 170 in accordance with one or more aspects of the present invention. In addition to Z Triage Unit 505, Expansion Unit 535, Z Test Unit 550, and Destination Z Write Unit 560, this embodiment of Z Operations Unit 170 includes a Stencil Test Unit 515. Stencil Test Unit 515 receives the source data for a z buffer tile from Fragment Shader 155 or Z Data Pipeline 175 and stencil data for the z buffer tile from Memory Controller 120. Stencil Test Unit 515 performs stencil testing, when stencil testing is enabled, using the source data, using techniques known to persons skilled in the art. If the source data passes the stencil test, Stencil Test Unit 515 outputs the source data to Z Triage Unit 505. If the source data fails the stencil test, the source data is discarded and Destination Z Write Unit 560 does not initiate a write request.

Figure 6A:
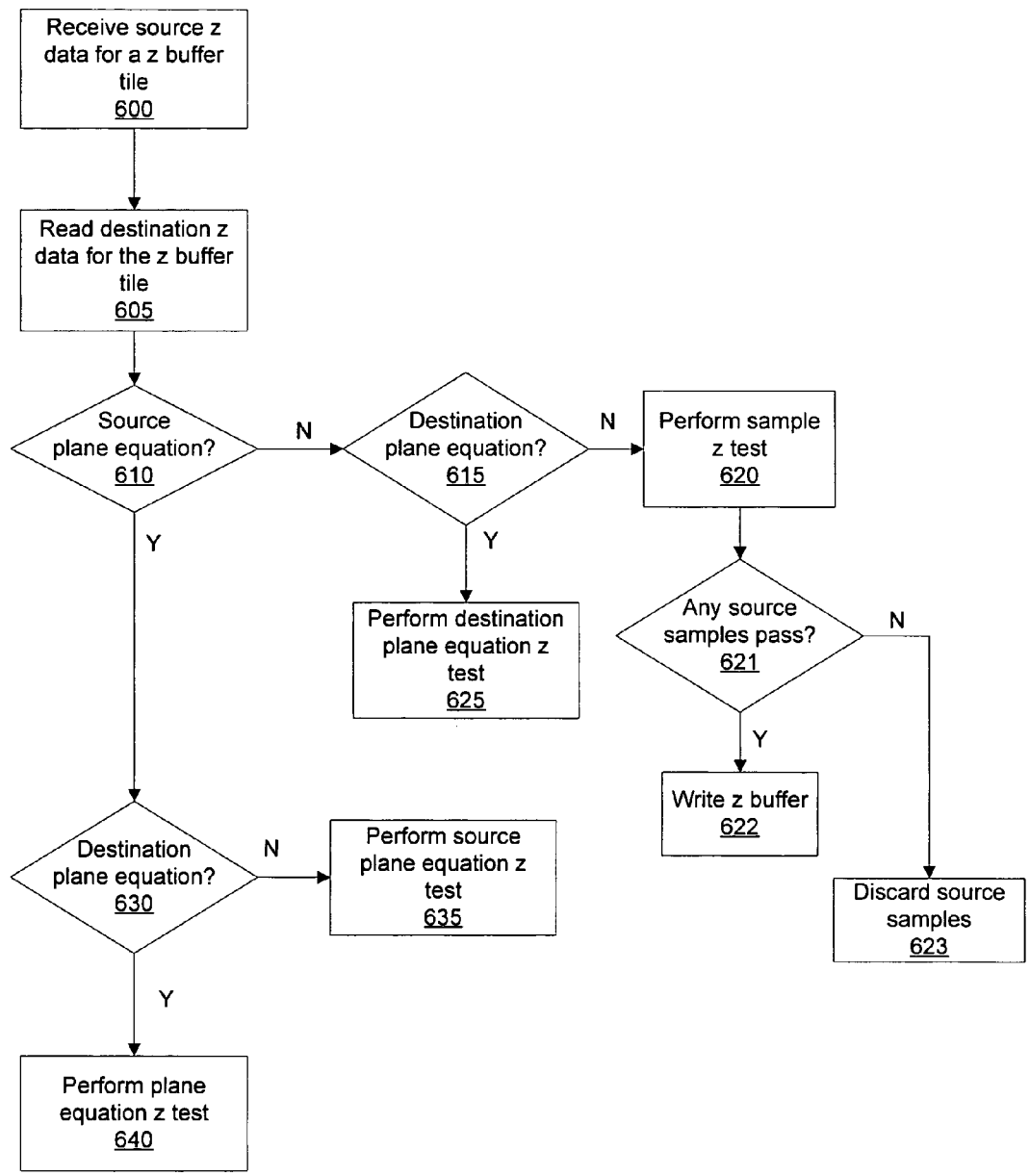

FIG. 6A illustrates an embodiment of a method of using a planar z representation for z compression in accordance with one or more aspects of the present invention. In step 600 Z Operations Unit 170 receives source z data for a z buffer tile. In step 605 Raster Operations Unit 165 initiates a read request for the destination z data corresponding to the z buffer tile. In step 610, Z Triage Unit 505 determines if the source z data is represented using tile specific plane equation coefficients, i.e., is compressed, and, if not, in step 615, Z Triage Unit 505 determines if the destination z data is represented using tile specific plane equation coefficients. If, in step 615 Z Triage Unit 505 determines the destination z data is represented using tile specific plane equation coefficients, then in step 625 Z Triage Unit 505, Expansion Unit 535, Z Test Unit 550, and Destination Z Write Unit 560 completing the z operations for z buffering using the destination tile specific coefficients and the source z values, as further described in conjunction with FIG. 6B.

If, in step 615 Z Triage Unit 505 determines the destination z data is not represented using tile specific plane equation coefficients, i.e., the destination z data is not compressed, then in step 620, Z Triage Unit 505 determines the trivial z test result and Expansion Unit 535 receives and outputs the source z values and destination z values. In step 621 Z Test Unit 550 determines which source z values pass the z test specified by a z test mode, and outputs the surviving coverage information to Destination Z Write Unit 560. In step 621, Destination Z Write Unit 560 determines if the surviving coverage information indicates that any source z values passed the z test, and, if not, Destination Z Write Unit 560 discards the source z values. If, in step 621, Destination Z Write Unit 560 determines that the surviving coverage information indicates that at least one source z value passed the z test, and, if so, Destination Z Write Unit 560 formats the surviving source z values and outputs a write request to write the uncompressed source z values to the z buffer tile via Memory Controller 120. The surviving destination z values are retained in the z buffer.

If, in step 610 Z Triage Unit 505 determines the source z data is represented using tile specific plane equation coefficients, then in step 630 Z Triage Unit 505 determines if the destination z data is represented using tile specific plane equation coefficients. If, in step 630 Z Triage Unit 505 determines the destination z data is represented using tile specific plane equation coefficients, then in step 640 Z Triage Unit 505, Expansion Unit 535, Z Test Unit 550, and Destination Z Write Unit 560 complete the z operations for z buffering using the destination tile specific coefficients and the source tile specific coefficients, as further described in conjunction with FIG. 6C. If, in step 630 Z Triage Unit 505 determines the destination z data is not represented using tile specific plane equation coefficients, then in step 635 Z Triage Unit 505, Expansion Unit 535, Z Test Unit 550, and Destination Z Write Unit 560 complete the z operations for z buffering using the source tile specific coefficients and the destination z values, as further described in conjunction with FIG. 6D.

Figure 6B:
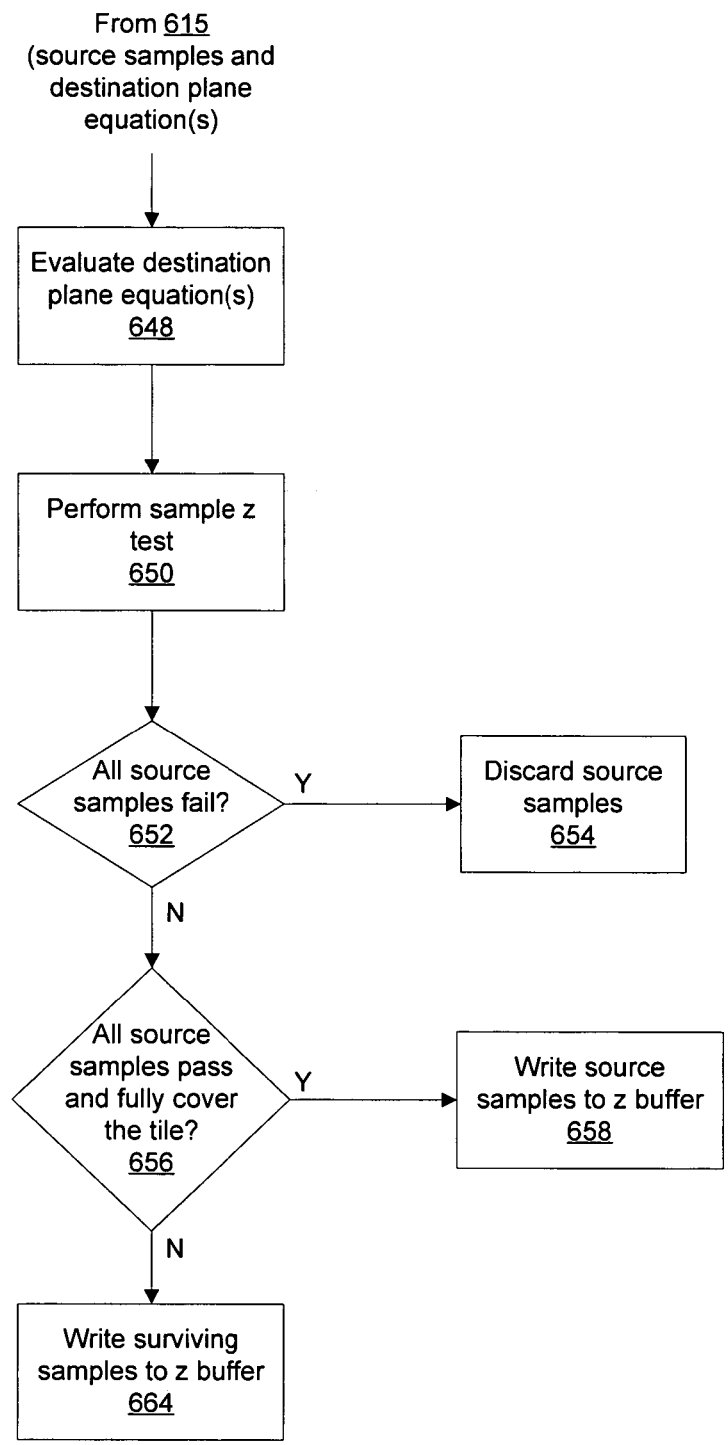

FIG. 6B illustrates an embodiment of a method of completing the z operations for z buffering using the destination tile specific coefficients and the source z values. When the source z data is uncompressed, the destination z plane equation is evaluated to determine sub-pixel z values prior to z testing. In step 648 Expansion Unit 535 evaluates one or more destination z plane equations using each set of tile specific destination coefficients included within the destination z data to compute a destination z value for each sub-pixel sample. Expansion Unit 535 outputs the destination z values and the source z values to Z Test Unit 550 and in step 650, Z Test Unit 550 performs z testing by comparing each source z value to the corresponding destination z value to produce the surviving coverage information which is output to Destination Z Write Unit 560. If, in step 652 Destination Z Write Unit 560 determines all of the source z values fail the z test based on the surviving coverage information, then in step 654 Destination Z Write Unit 560 discards the source z values.

If, in step 652 Destination Z Write Unit 560 determines at least one of the source z values passes the z bounds test, then in step 656 Destination Z Write Unit 560 determines if all of the source z values pass the z test and the source z values fully cover the z buffer tile. If, in step 656 Destination Z Write Unit 560 determines that all of the source z values pass the z test and fully cover the z buffer tile, then in step 658 Destination Z Write Unit 560 writes the source z values to the z buffer tile stored in the z buffer. Because the source z values were received from Fragment Shader 155, tile specific coefficients which represent the source z values in a compressed form are not available. Therefore, the source z values are stored in the z buffer tile in the uncompressed format. In alternate embodiments of the present invention Destination Z Write Unit 560 may include logic to determine if plane equation coefficients may be determined which represent the source z values and those plane equations may be stored as a planar z representation, i.e. a compressed z format. Such a compressed format is described in detail in U.S. patent application Ser. No. 09/687,036, entitled "Method and Apparatus For Managing and Accessing Depth Data in a Computer Graphics System," filed Oct. 12, 2000, and assigned to the assignee of the present invention, which is incorporated by reference as though fully set forth herein.

If, in step 656 Z Test Unit 550 determines that all of the source z values pass the z bounds test and fully cover the tile, then in step 658 Z Test Unit 550 outputs the surviving source z value(s) to Destination Z Write Unit 560. If, in step 656 Z Test Unit 550 determines that any of the source z values fail the z bounds test or the source z values only partially cover the tile, then in step 664 Destination Z Write Unit 560 initiates a write request to the z buffer tile within the z buffer to write the surviving source z value(s) and the surviving destination z value(s).

Figure 6C:
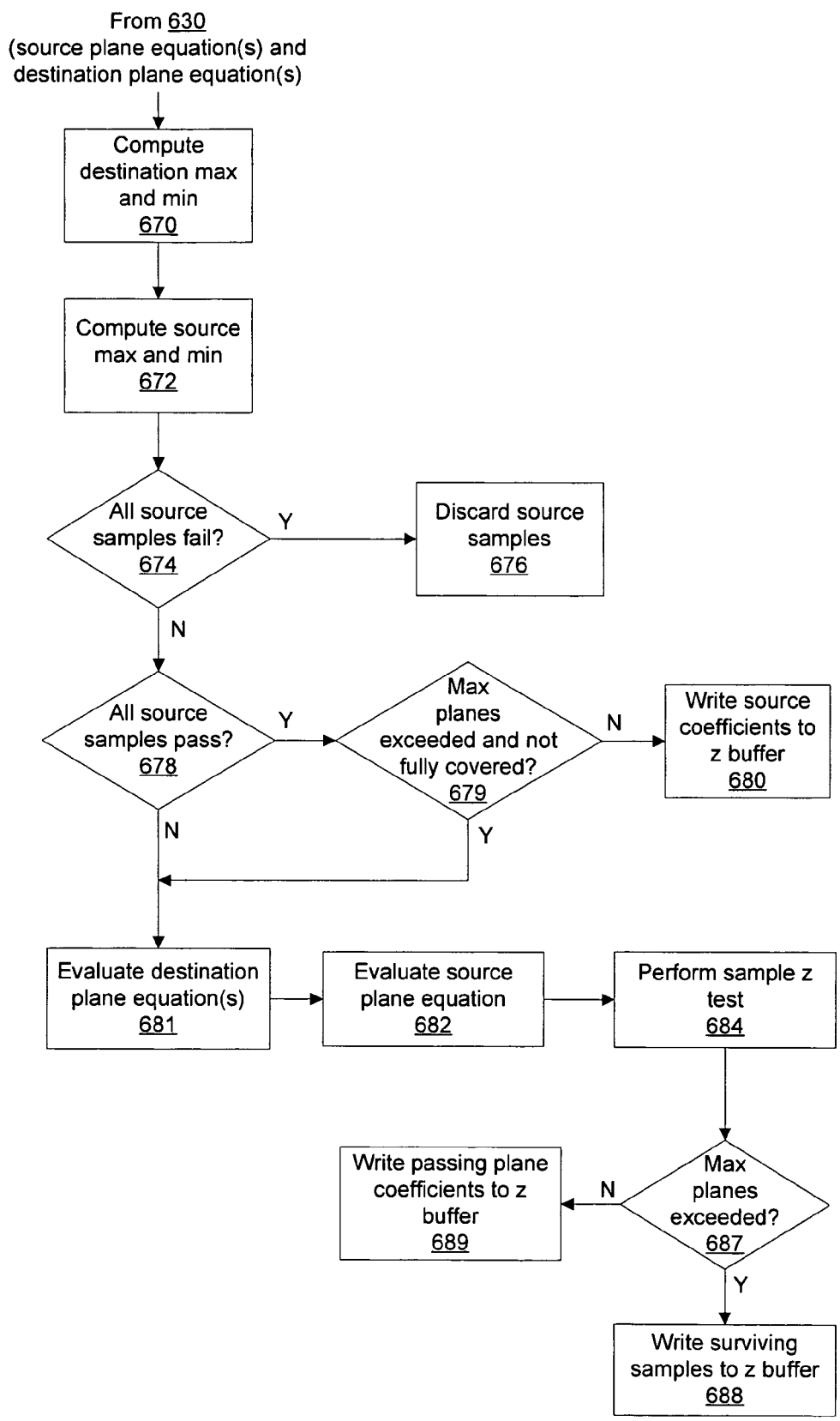

FIG. 6C illustrates an embodiment of a method of completing the z operations for z buffering using the destination tile specific coefficients and the source tile specific coefficients. In step 670 Z Triage Unit 505 determines the destination maximum and minimum z values. In step 672 Z Triage Unit 505 determines the source maximum and minimum z values. In step 674 Z Triage Unit 505 determines if all of the source z values (not yet computed) fail a z bounds test based on the specified z test mode, the source maximum and minimum z values, and the destination maximum and minimum z values. If, in step 674 Z Triage Unit 505 determines all of the source z values fail the z bounds test, then in step 676 Z Triage Unit 505 updates the trivial z test result to indicate that the source tile specific coefficients should be rejected. Therefore, the source z values are not computed.

If, in step 674 Z Triage Unit 505 determines at least one of the source z values passes the z bounds test, then in step 678 Z Triage Unit 505 determines if all of the source z values pass the z bounds test. If, in step 678 Z Triage Unit 505 determines that all of the source z values pass the z bounds test, then in step 679, Z Triage Unit 505 determines if the maximum number of planes is exceeded and the source z values do not fully cover the z buffer tile. Specifically, when a limited number of sets of tile specific coefficients may be stored for the z buffer tile, Z Triage Unit 505 determines if a set of tile specific coefficients may be stored for each surviving source z value and surviving destination z value according to the surviving coverage information.

If, in step 679 Z Triage Unit 505 determines the maximum number of planes is not exceeded or that the source z values do fully cover the z buffer tile, then in step 680 Z Triage Unit 505 updates the trivial z test result to indicate that the source tile specific coefficients should be accepted. Expansion Unit 535 outputs the source tile specific coefficients to Destination Z Write Unit 560 via Z Test Unit 550. Destination Z Write Unit 560 initiates a write request to the z buffer tile within the z buffer to write the source tile specific coefficients and the source coverage information to the z buffer tile stored in the z buffer. When the maximum number of planes is not exceeded and the source z values do not fully cover the z buffer tile, the write request initiated by Destination Z Write Unit 560 also includes one or more sets of the destination tile specific coefficients and the destination coverage information. In an alternative embodiment of the present invention, step 679 is omitted and in step 678 Z Triage Unit 505 proceeds directly to step 680 only when the source z values fully cover the z buffer tile and all of the source values pass the z bounds test.

If, in step 679 Destination Z Write Unit 560 determines the maximum number of planes is exceeded and the source z values do not fully cover the z buffer tile, then Z Triage Unit 505 updates the trivial z test result to indicate that the source and destination z values for each sub-pixel sample position need to be compared and proceeds to step 681.

If, in step 678 Z Triage Unit 505 determines that all of the source z values do not either fail or pass the z bounds test, then in step 678 Z Triage Unit 505 updates the trivial z test result to indicate that the source and destination z values for each sub-pixel sample position need to be compared and proceeds to step 681. In step 681 Expansion Unit 535 evaluates one or more destination z plane equations using each set of tile specific destination coefficients included within the destination z data to compute a destination z value for each sub-pixel sample. In step 682 Expansion Unit 535 evaluates the source z plane equation using the tile specific source coefficients included within the source z data to compute a source z value for each sub-pixel sample. Expansion Unit 535 outputs the destination z values and the source z values to Z Test Unit 550 and in step 684, Z Test Unit 550 performs z testing by comparing each source z value to the corresponding destination z value to produce surviving coverage information, surviving source z values, and surviving destination z values and proceeds to step 687.

In step 687, Destination Z Write Unit 560 determines if the maximum number of planes is exceeded. If, in step 687 Destination Z Write Unit 560 determines the maximum number of planes is exceeded, then in step 688 Destination Z Write Unit 560 initiates a write request to the z buffer tile within the z buffer to write the surviving source z value(s) and the surviving destination z value(s). If, in step 687 Destination Z Write Unit 560 determines the maximum number of planes is not exceeded, then in step 689 Destination Z Write Unit 560 initiates a write request to the z buffer tile within the z buffer to write the source tile specific coefficients, one or more sets of the destination tile specific coefficients, and the surviving coverage information.

Figure 6D:
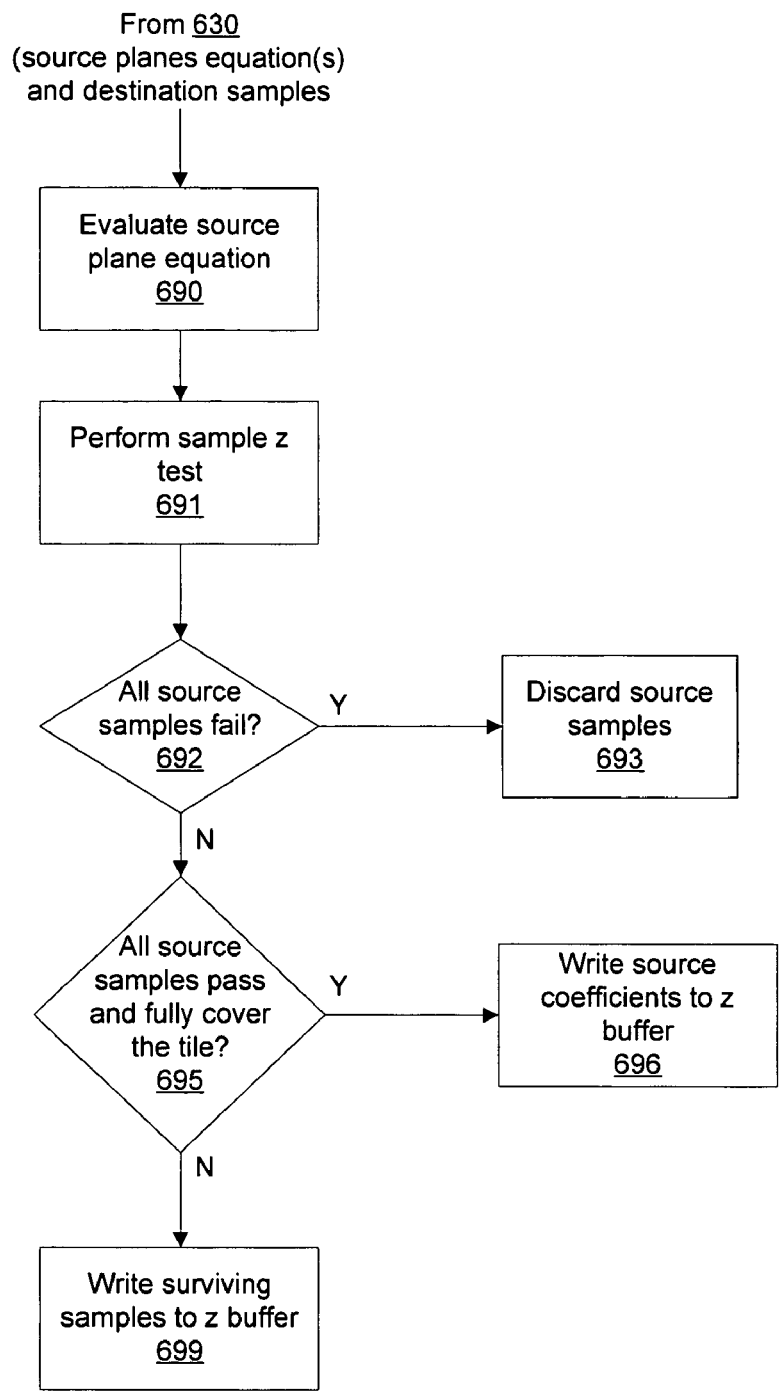

FIG. 6D illustrates an embodiment of a method of completing the z operations for z buffering for z buffering using the source tile specific coefficients and the destination z values. In step 690 Expansion Unit 535 evaluates the source z plane equation using the tile specific destination coefficients included within the source z data to compute a source z value for each sub-pixel sample. Expansion Unit 535 outputs the destination z values and the source z values to Z Test Unit 550 and in step 691, Z Test Unit 550 performs z testing by comparing each source z value to the corresponding destination z value to produce surviving coverage information. In step 692 Destination Z Write Unit 560 determines if all of the source z values failed the z test based on the surviving coverage information. If, in step 692 Destination Z Write Unit 560 determines all of the source z values failed the z test, then in step 693 Destination Z Write Unit 560 discards the source z values.

If, in step 692 Destination Z Write Unit 560 determines that the all of the source z values did not fail the z test, then in step 695 Destination Z Write Unit 560 determines if all of the source z values passed the z test and the source z values fully cover the z buffer tile. If, in step 695 Destination Z Write Unit 560 determines that all of the source z values passed the z test and fully cover the z buffer tile, then in step 696 Destination Z Write Unit 560 writes the source tile specific coefficients and source coverage information to the z buffer tile stored in the z buffer. Therefore, the format of the destination z data read in step 605 does not necessarily constrain the z buffer tile from storing z data in a compressed format (the source z data written in step 696) following the z operations.

If, in step 695 Destination Z Write Unit 560 determines that all of the source z values do not pass the z test or that the source z values do not fully cover the z buffer tile, then in step 699 Destination Z Write Unit 560 initiates a write request to the z buffer tile within the z buffer to write the surviving source z values and surviving destination z values.

Persons skilled in the art will appreciate that any system configured to perform the method steps of FIGS. 6A, 6B, 6C, and 6D, or their equivalents, is within the scope of the present invention.

FIG. 7 illustrates an alternative embodiment of a method of using compressed z data in accordance with one or more aspects of the present invention. In step 700 Z Operations Unit 170 receives source z data for a z buffer tile. In step 701 Stencil Test Unit 515 determines whether or not the source z data should be rejected based on a stencil test. If, in step 701 Stencil Test Unit 515 determines that the source data should be rejected, in step 723 the source z data is discarded. If, in step 701 Stencil Test Unit 515 determines that the source data should not be rejected, then Z Operations Unit 170 proceeds to complete steps 705 through 740 as necessary. Steps 705, 710, 715, 720, 721, 722, 723, 725, 730, 735, and 740 that are completed in the same manner as steps 605, 610, 615, 620, 621, 622, 623, 625, 630, 635, and 640 of FIG. 6A respectively. Persons skilled in the art will appreciate that any system configured to perform the method steps of FIG. 7, or its equivalents, is within the scope of the present invention.

The present invention includes systems and methods for compressing z data and decompressing z data using a planar z representation. Using compressed z data reduces the bandwidth needed to access the z buffer during image rendering. Using the planar z representation for compression minimizes the computations needed to compress the source z data prior to storing it in the z buffer and permits trivial rejection or acceptance of the source z data without requiring decompression of the destination z data read from the z buffer. Furthermore, the planar z representation is independent of sub-pixel positions specified by the multisample mode.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A z operations unit, comprising:
a source z evaluation unit configured to compute a source z value using tile specific coefficients for a plane equation defining a fragment of a source primitive, wherein the fragment is a portion of the source primitive that is within a tile, wherein the tile includes portions of at least two scanlines each of the tile specific coefficients based on a reference position within the tile wherein the reference position is unique to the tile and is not shared with any other tiles that are intersected by the primitive;
a z triage unit configured to determine a minimum source z value and a maximum source z value for the fragment using the tile specific coefficients and produce a trivial z test result that indicates whether the fragment should be rejected, the fragment should be accepted, or that the source z value should be computed and compared with a destination z value;
a destination z evaluation unit configured to receive destination z data from a z buffer and produce the destination z value; and
a z test unit configured to determine whether or not the source z value or the destination z value should be stored in the z buffer.

2. The z operations unit of claim 1, further comprising:
a stencil test unit configured to determine whether or not the source z value passes a stencil test.

3. The z operations unit of claim 1, further comprising:
a destination z write unit configured to write the source z value represented in a compressed or uncompressed format to the z buffer when the z test unit determines the source z value should be stored in the z buffer.

4. The z operations unit of claim 1, wherein the z triage unit is further configured to determine a minimum destination z value and a maximum destination z value using the destination z data and output the trivial z test result to the z test unit.

5. The z operations unit of claim 1, wherein the source z value and the destination z value each correspond to a sub-pixel sample position specified by a multisample mode.

6. The z operations unit of claim 5, wherein the source z evaluation unit is further configured to compute a z value for each sub-pixel sample position using the destination z data to produce destination z values.

7. The z operations unit of claim 6, wherein each sub-pixel sample position is specified by a multisample mode.

8. The z operations unit of claim 1, wherein the z operations unit is included within a raster operations unit configured to receive fragment data and produce z data.

9. The z operations unit of claim 1, wherein the tile specific coefficients are produced by a rasterizer.

10. The z operations unit of claim 1, further comprising a means for writing the set of tile specific coefficients to a z buffer.

11. The z operations unit of claim 1, including a z buffer for storing the tile specific coefficients for the plane equation defining the fragment in when the trivial z test result indicates the fragment should be accepted.

12. The z operations unit of claim 1, wherein the z triage unit is configured to reject the tile specific coefficients for the plane equation defining the fragment in a z buffer when the trivial z test result indicates the fragment should be rejected.

* * * * *